United States Patent [19]

Wagster et al.

[11] Patent Number: 5,379,846

[45] Date of Patent: Jan. 10, 1995

[54] ELECTRICAL APPLIANCE AND HANDLE FOR SAME

[75] Inventors: Robert P. Wagster, Baltimore; Vernon R. Lacher, Fallston; John S. Vantran, Baltimore, all of Md.

[73] Assignee: Black & Decker Inc., Newark, Del.

[21] Appl. No.: 1,148

[22] Filed: Jan. 7, 1993

[51] Int. Cl.[6] .................. B25G 3/04; B25G 3/32; A01D 34/84

[52] U.S. Cl. .................. 172/15; 403/312; 56/DIG. 18; 30/DIG. 5

[58] Field of Search ............ 56/DIG. 18; 16/116 R; 30/DIG. 5, 296.1, 275.4, 276; 403/311, 312, 377, 378, 379, 108, 13, 14; 172/15; 37/241, 244; 15/410, 143.1; 411/383, 546

[56] References Cited

U.S. PATENT DOCUMENTS

| | | | |
|---|---|---|---|
| 3,759,020 | 9/1973 | Simmons | 30/DIG. 5 X |
| 3,803,819 | 4/1974 | Ehrlich . | |
| 3,858,383 | 1/1975 | Glover . | |
| 3,879,573 | 4/1975 | Ehrlich | 16/116 R X |
| 3,886,716 | 6/1975 | Sellers . | |
| 4,018,037 | 4/1977 | Weber . | |
| 4,136,446 | 1/1979 | Tripp . | |
| 4,156,967 | 6/1979 | Ballas, Sr. | 30/276 |
| 4,397,088 | 8/1983 | Hampel | 30/296.1 |
| 4,761,939 | 8/1988 | Zerrer . | |
| 4,829,675 | 5/1989 | Beihoffer . | |
| 4,852,258 | 8/1989 | Foster | 30/276 |
| 4,976,031 | 12/1990 | Miller | 30/296.1 |

Primary Examiner—Randolph A. Reese
Assistant Examiner—Christopher J. Novosad
Attorney, Agent, or Firm—Harness, Dickey & Pierce

[57] ABSTRACT

An electrically-powered appliance, such as a line-type grass trimmer, lawn edger, snowthrower, or the like, includes a housing, an elongated hollow tubular handle, an elongated electrical cable extending through and within the tubular handle, and an attachment arrangement for attaching the tubular handle to the housing. The housing includes an attachment portion and a removable portion, preferably of a common "clamshell" configuration, with fasteners extending through openings in these housing portions for fastening them to one another with the tubular handle securely clamped therebetween. Such tubular handle has openings extending laterally therethrough which correspond to the openings through the attachment and removable housing portions. The housing openings and the handle openings are laterally aligned with one another during assembly in order to ensure proper alignment and positioning of the handle when the housing portions are fastened to one another with the handle clamped therebetween. In order to further assure such proper alignment, and to facilitate ease of maintaining such proper alignment while the fasteners are inserted through the housing and handle openings, the housing portions each preferably include internal annular bosses surrounding their respective housing openings. The openings in the tubular handle are sized to receive the internal annular bosses on the housing portions in order to aid in the proper alignment and the maintenance of such proper alignment during assembly.

27 Claims, 2 Drawing Sheets

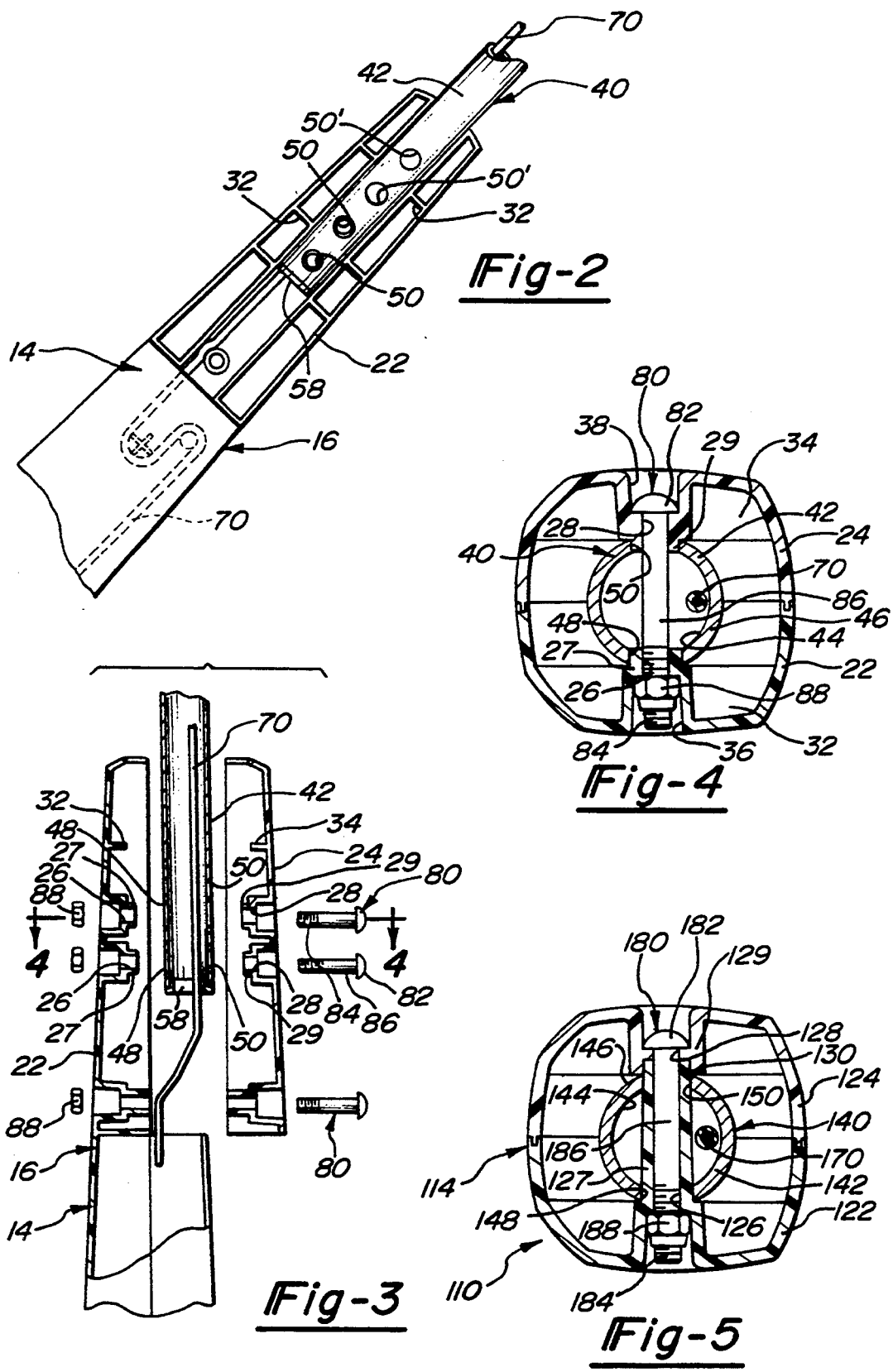

ELECTRICAL APPLIANCE AND HANDLE FOR SAME

BACKGROUND AND SUMMARY OF THE INVENTION

The present invention relates generally to electrical appliances or equipment having an elongated handle extending from a housing for an electrical motor or other electrically-powered component. Specifically, the present invention is especially applicable to outdoor power equipment, such as grass trimmers, lawn edgers, small snowthrowers, or other similar devices.

Various electrical appliances and other power equipment are adapted for handheld use and include a housing for a motor or other active power-driven component, with an upwardly-extending handle assembly secured to the housing. Typically, the handle assembly is long enough to allow operation of the appliance by an operator standing in an upright position while the housing for the power-driven component rides on the ground or is held adjacent to the ground.

The handle assemblies in these types of equipment are frequently constructed of a hollow tubular member or members, of either a circular or non-circular cross-sectional shape, with at least a portion of the hollow tubular handle member being disconnected or disassembled from the housing in order to conserve space and packaging materials during shipping and sales display. Prior to use and operation of the equipment, however, the tubular handle member or members must be assembled (typically by the end user) into the above-described upwardly-extending handle configuration. Such tubular handle members are hollow in order to provide an open interior, through which an electrical cable extends in order to supply power from a cord (usually near the upper end of the handle) to the active power-driven component in the housing (usually at the lower end of the equipment). In such arrangements, it is also conventional to provide electrical switching and/or speed controls at the upper end of the handle assembly.

Because of the above-described disassembled condition of such electrical appliances or equipment during shipping, it is often difficult or cumbersome to assemble the unit without pinching or crimping the electrical cable running through the tubular handle into the housing for the motor or other power-driven component, thus causing resistance to the proper alignment of the handle and housing. In addition, because of the existence of the electrical cable, it is sometimes troublesome to maintain such proper handle and housing alignment while fasteners are inserted and tightened during installation and assembly.

The present invention seeks to address the problems associated with prewired electrical appliances or equipment having handles and housings that are disassembled during shipping, but which require assembly prior to operation of the equipment, and to facilitate the ease and convenience with which such assembly is accomplished.

In accordance with the present invention, an electrically-powered appliance, such as a line-type grass trimmer, lawn edger, snowthrower, or the like, includes a housing, an elongated hollow tubular handle, an elongated electrical cable extending through and within the tubular handle, and an attachment arrangement for attaching the tubular handle to the housing in an upwardly-extending, longitudinally-extending configuration. In such an attachment arrangement, an extension or other portion of the housing includes an attachment portion and a removable portion, preferably of a common "clamshell" configuration, with fasteners extending through one or more openings in these attachment and removable housing portions for fastening these portions to one another with at least an end portion of the tubular handle securely clamped therebetween. Such tubular handle end portion has one or more handle openings extending laterally therethrough on laterally-aligned opposite sides thereof, corresponding to the number of housing openings extending through the attachment and removable housing portions. The housing openings and the handle openings are laterally aligned with one another in order to ensure proper alignment and positioning of the handle when the attachment and removable housing portions are fastened to one another with the end portion of the handle clamped therebetween.

In order to further assure such proper alignment of the handle with the housing, and to facilitate ease of maintaining such proper alignment while the fasteners are inserted through the housing and handle openings, the attachment and removable portions of the housing each preferably include internal annular bosses generally surrounding their respective housing openings. The handle openings, which extend through opposite sides of the tubular handle, are sized to receive the internal annular bosses on the attachment and removable housing portions in order to aid in the proper alignment and maintenance of such proper alignment during assembly.

Additional objects, advantages, and features of the present invention, along with variations on the present invention, will become apparent from the following description and the appended claims, taken in conjunction with the accompanying drawings.

BRIEF DESCRIPTION OF THE DRAWINGS

FIG. 2 is a fragmentary side view of a portion of the housing of the exemplary lawn edger of FIG. 1, shown with the lower end portion of the tubular handle properly aligned on the fixed attachment portion of the housing and with the removable portion of the housing removed for clarity.

FIG. 3 is a partial exploded frontal view illustrating the interconnection and assembly of the housing and the tubular handle member of the exemplary lawn edger of FIG. 1.

FIG. 4 is a cross-sectional view, taken generally along line 4—4 of FIG. 3, but illustrating the handle and housing in a completed, assembled condition.

FIG. 5 is a cross-sectional view similar to that of FIG. 4, but illustrating an alternate variation of the present invention.

DETAILED DESCRIPTION OF THE PREFERRED EMBODIMENTS

Figure 1:
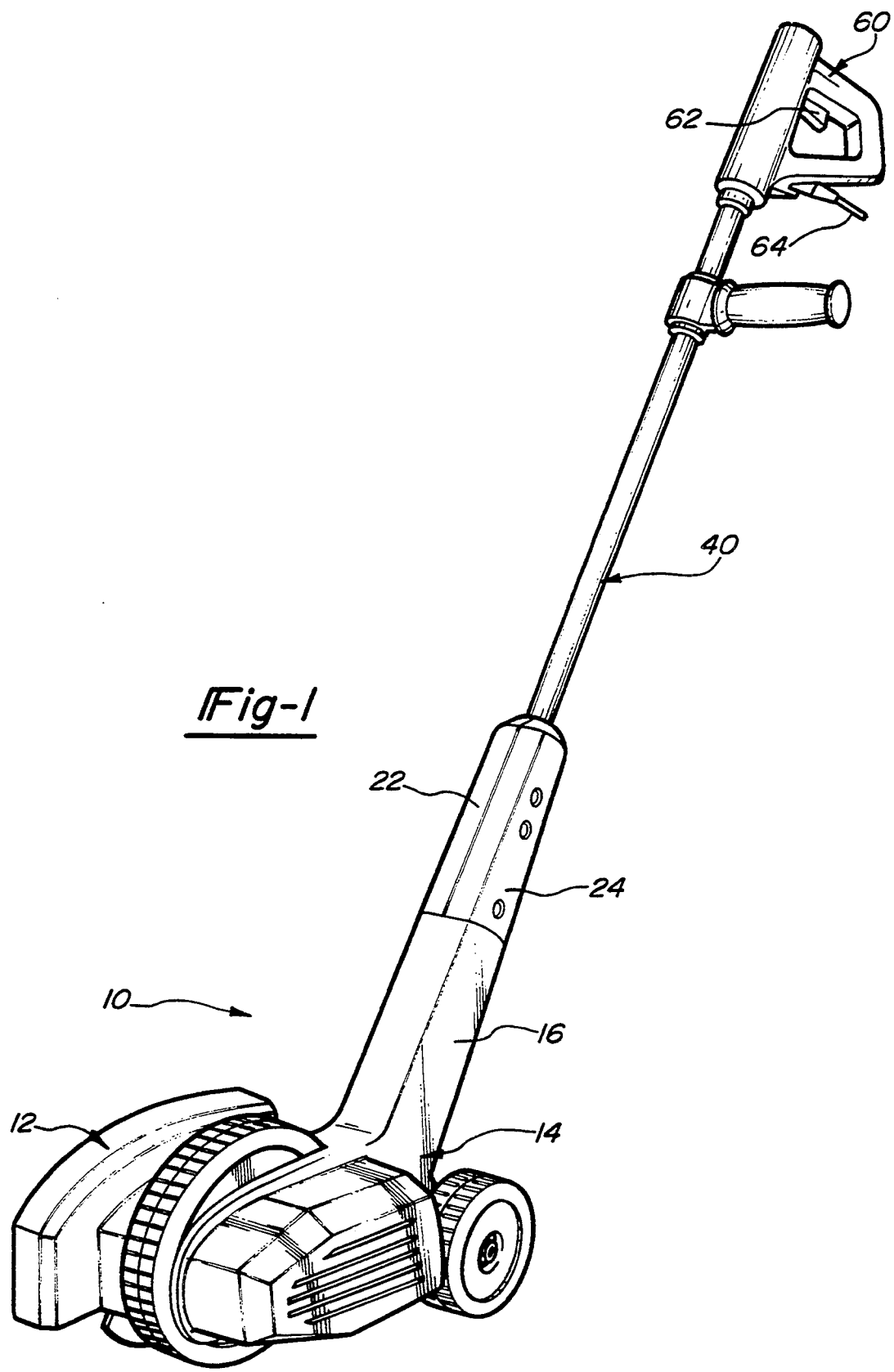
FIG. 1 is an overall perspective view of an exemplary lawn edger, shown for purposes of illustration and having a handle-and-housing arrangement in accordance with the present invention.

FIGS. 1 through 5 illustrate exemplary embodiments of the present invention, shown for purposes of illustration as applied to a lawn edger. One skilled in the art will readily recognize from the following discussion, as well as from the appended drawings and claims, that the present invention is equally applicable to electrically-powered appliances or equipment other than lawn edgers, as well as to lawn edgers other than that shown for purposes of illustration in the drawings.

In FIG. 1, an exemplary electric lawn edger 10 includes a motor assembly 12, having a motor housing 14 with a lower handle extension portion 16 protruding in a generally upwardly and rearwardly direction therefrom. The motor housing 14 is preferably of a clamshell configuration, such that at its upper and rearward end, it includes a fixed attachment portion 22, which is integrally formed with the remainder of the housing 14, and a removable portion 24 fastened to the attachment portion 22. A tubular handle 40 is securely clamped between these attachment and removable housing portions 22 and 24.

An operating handle 60 is typically included at the upper end of the handle assembly 40 and includes an electrical switch or speed control 62 and a power cord 64. As is discussed above, the tubular handle assembly 40 is disconnected from the lower handle extension 16 of the motor housing 14 during shipping of the edger 10, but assembly of these components in the proper, longitudinally-aligned configuration shown in FIG. 1 is required prior to use or operation of the edger 10.

FIGS. 2 through 4 illustrate the assembly of the tubular handle 40 and the housing 14 in accordance with the present invention. The fixed attachment portion 22 of the lower housing handle extension 16 includes one or more openings 26 extending therethrough and longitudinally spaced from one another. Internal annular bosses 27 generally surround the openings 26 on the interior side of the attachment portion 22, and external recesses 36 generally surround the openings 26 on the exterior side of the attachment portion 22. Reinforcing ribs 32 protrude inwardly from the interior side of the attachment housing portion 22 and extend laterally across substantially its entire width in order to stiffen and strengthen the attachment portion 22, as well as to engage the tubular handle 40 during and after assembly.

Similarly, the removable housing portion 24 has one or more corresponding openings 28 extending laterally therethrough, with its internal annular bosses 29 on the interior side thereof, as well as its external recesses 38 on the exterior side thereof, both surrounding respective openings 38. Also, as is provided in the attachment housing portion 22, reinforcing ribs 34 protrude inwardly from the interior side of the removable housing portion 24 and extend laterally thereacross for stiffening and strengthening the removable housing portion 24 and for engaging the tubular handle 40.

The tubular handle assembly 40 is generally hollow and can be of the circular cross-sectional shape illustrated in the drawings, or it can be other non-circular cross-sectional shapes. The tubular handle 40 has an inner wall surface 44 and an outer wall surface 46, with one or more sets of openings 48 and openings 46 extending laterally through the wall of the handle end portion 42 on laterally-aligned opposite sides thereof. Preferably, a grommet 58, which can be composed of an elastomeric or plastic material, for example, is provided at the terminal end of the handle portion 42 to substantially minimize chaffing or scraping of an electrical cable 70 running longitudinally within the elongated tubular handle 40 and the housing handle extension portion 16.

A number of male fasteners 80, corresponding to the number of openings in the housing handle extension 16 and the handle portion 42, are provided, along with a corresponding number of female fasteners 88 for securing the attachment portion 22 and the removable portion 24 of the housing 14 to one another with the handle end portion 42 securely clamped therebetween. The male fastener 80 is preferably a threaded fastener having a head end 82, a threaded end 84, and a non-threaded shank 86. The female fastener 88 is also preferably a threaded fastener, equipped with locking means in order to prevent it from vibrating loose from the threaded end 84 of the male fastener 80. Such locking means is not described in detail herein, but can be any of a number of known locking inserts, thread-locking compounds, or other such locking means known to those skilled in the art.

Preferably, in order to aid in the convenient assembly of the appliance, the external recesses 36 on the fixed attachment housing portion 22 are shaped to engage and rotationally restrain the female fasteners 88, which can be of a common hex-shaped configuration, or which can be knurled so as to be force-fitted in such engagement within the external recesses 36. Of course this feature by which the external recesses 36 engage and rotationally restrain the female fasteners 88 can be provided on the external recesses 38 in the event that the male fasteners 80 are inserted from the side of the attachment housing portion 22, rather than from the side of the removable housing portion 24.

As can perhaps best be seen in FIG. 4, the openings 48 and 50 on opposite sides of the end portion 42 of the hollow tubular handle 40 are sized to receive the internal annular bosses 27 and 29, respectively. This engagement, along with the abutting engagement of the reinforcing ribs 32 and 34 with the exterior sides of the handle end portion 42, serve to stabilize and securely fix the tubular handle 40 in its properly aligned relationship with the housing handle extension 16 after the assembly operation is completed. In addition, such engagement of the internal annular bosses 27 and 29 extending into the handle openings 48 and 50, respectively, aids the user during assembly by holding and maintaining the handle end portion 42 in its proper, aligned position while the male fasteners 80 are inserted into the assembly to threadably engage the female fasteners 88. Thus, the invention facilitates the ease of assembly of the edger 10 by allowing the end portion 42 of the tubular handle 40 to be laterally laid in place in proper alignment on the fixed attachment housing portion 22 while the removable housing portion 24 is laterally placed in position, ready for insertion of the fasteners 80 and 88. This arrangement eliminates what would otherwise involve the difficult and cumbersome longitudinal insertion of the handle end portion 42 into a longitudinally-presenting opening in the upper end of the housing extension 16, which could be very difficult to accomplish without crimping or pinching the electrical cable 70.

FIG. 5 illustrates an alternate variation on the present invention. Components of FIG. 5 that are identical or similar to corresponding components of FIGS. 1 through 4 are indicated by reference numerals that are the same as those for FIGS. 1 through 4, but which have one-hundred prefixes in FIG. 5.

The edger 110 in FIG. 5 is substantially identical to the edger 10 of FIGS. 1 through 4, except that the internal annular bosses 127 on the fixed attachment housing portion 122 are laterally elongated to extend completely through the corresponding 148 and 150 openings in the end portion 142 of the tubular handle 140. The internal annular bosses 129 on the removable housing portion 124 include internal recesses 130 for receiving and engaging the free ends of the laterally-elongated annular bosses 127.

The alternate arrangement in FIG. 5 can be employed in assemblies where the components are larger, heavier, or otherwise more cumbersome to handle, such that the additional holding engagement of the laterally elongated bosses 127 through the handle openings 148 and 150 are deemed necessary or desirable for a more secure attachment of the tubular handle 140 to the housing 114, or for the enhanced holding effect of the tubular handle member 140 in place during assembly.

It should be noted that the internal annular boss 129 can be laterally elongated to be received within an internal recess on the internal boss 127, in lieu of the opposite arrangement as depicted merely for purposes of illustration in FIG. 5.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. An electrically-powered appliance having a housing, an elongated hollow tubular handle, an elongated electrical cable extending longitudinally within the tubular handle, and attachment means for attaching the tubular handle to the housing, said attachment means including an attachment portion of the housing, a removable portion of the housing, and fastener means for fastening said attachment and removable housing portions to one another with an end portion of the tubular handle clamped therebetween, said end portion of the tubular handle having handle openings extending laterally therethrough on laterally-aligned opposite sides thereof, and each of said attachment and removable housing portions having at least one housing opening extending therethrough, said housing openings and said handle openings being laterally aligned with one another to properly position the handle relative to the housing when said attachment and removable housing portions are fastened to one another with said end portion of the handle clamped therebetween, at least one of said attachment and removable housing portions having alignment means thereon for interlockingly engaging at least one of said handle openings to ensure said proper positioning of the handle when said attachment and removable housing portions are fastened to one another with said end portion of the handle clamped therebetween, said alignment means including an alignment member protruding inwardly from said one of said attachment and removable housing portions, said alignment member having a larger portion and a smaller portion stepped-down relative to said larger portion, said stepped-down smaller portion being received within at least one of said handle openings, and said larger portion abuttingly engaging an outer surface of said end portion of said handle when said attachment and removable housing portions are fastened to one another with said end portion of the handle clamped therebetween.

2. An appliance according to claim 1, wherein the appliance is a lawn edger.

3. An electrically-powered appliance having a housing, an elongated hollow tubular handle, an elongated electrical cable extending longitudinally within the tubular handle, and attachment means for attaching the tubular handle to the housing, said attachment means including an attachment portion of the housing, a removable portion of the housing, and fastener means for fastening said attachment and removable housing portions to one another with an end portion of the tubular handle clamped therebetween, said end portion of the tubular handle having handle openings extending laterally therethrough on laterally-aligned opposite sides thereof and each of said attachment and removable housing portions having at least one housing opening extending therethrough, said housing openings and said handle openings being laterally aligned with one another to properly position the handle relative to the housing when said attachment and removable housing portions are fastened to one another with said end portion of the handle clamped therebetween, said attachment and removable housing portions each including an annular boss generally surrounding the respective housing opening therethrough, said handle openings receiving said annular bosses therein to ensure said proper positioning of the handle when said attachment and removable housing portions are fastened to one another with said end portion of the handle clamped therebetween, at least one of said annular bosses having a larger portion and a smaller portion stepped-down relative to said larger portion at an end thereof, said stepped-down smaller portion being received within one of said handle openings, and said larger portion abuttingly engaging an outer surface of said end portion of the handle.

4. An appliance according to claim 3, wherein said fastener means includes a threaded male fastener insertable into said handle and housing openings from a first side of the appliance to extend therethrough and a threaded female fastener engageable with said threaded male fastener on a second, opposite side of the appliance.

5. An appliance according to claim 4, wherein said male fastener has a head end portion at one end thereof and a threaded end portion at the opposite end thereof, said housing opening on one of said attachment and removable housing portions having a recess opening formed therearound for receiving said head end portion in a recessed relationship relative to the housing, said housing opening on the other of said attachment and removable housing portions also having a recess opening formed therearound for receiving, engaging and rotationally restraining said female fastener.

6. An appliance according to claim 5, wherein said appliance includes a number of said laterally-aligned handle and housing openings spaced longitudinally apart from one another, and a corresponding number of said fastener means.

7. An appliance according to claim 6, wherein each of said male fasteners has a non-threaded shank portion between said head end portion and said threaded end portion, said shank portion extending from one side to the other of said hollow tubular handle end portion.

8. An appliance according to claim 3, wherein said annular boss on one of said attachment and removable housing portions is laterally elongated and extends laterally completely through said end portion of the hollow tubular handle and through said handle openings on said laterally-aligned opposite sides thereof to engage the annular boss on the other of said attachment and removable housing portions.

9. An appliance according to claim 8, wherein said annular boss on the other of said attachment and removable housing portions includes an internal recess opening surrounding said housing opening therein, said internal recess opening receiving said laterally elongated annular boss therein.

10. An appliance according to claim 9, wherein said fastener means includes a threaded male fastener insertable into said handle and housing openings from a first side of the appliance to extend therethrough and a threaded female fastener engageable with said threaded male fastener on a second, opposite side of the appliance.

11. An appliance according to claim 10, wherein said male fastener has a head end portion at one end thereof and a threaded end portion at the opposite end thereof, said housing opening on one of said attachment and removable housing portions having an external recess opening formed therearound for receiving said head end portion in a recessed relationship relative to the housing, said housing opening on the other of said attachment and removable housing portions also having an external recess opening formed therearound for receiving, engaging and rotationally restraining said female fastener.

12. An appliance according to claim 11, wherein said appliance includes a number of said laterally-aligned handle and housing openings spaced longitudinally apart from one another, and a corresponding number of said fastener means.

13. An appliance according to claim 12, wherein each of said male fasteners has a non-threaded shank portion between said head end portion and said threaded end portion, said shank portion extending from one side to the other of said hollow tubular handle end portion.

14. An electrically-powered appliance having a housing, an elongated hollow tubular handle, an elongated electrical cable extending longitudinally within the tubular handle, and attachment means for attaching the tubular handle to the housing, said attachment means including an attachment portion of the housing, a removable portion of the housing, and fastener means for fastening said attachment and removable housing portions to one another with an end portion of the tubular handle clamped therebetween, said end portion of the tubular handle having handle openings extending laterally therethrough on laterally-aligned opposite sides thereof, and each of said attachment and removable housing portions having at least one housing opening extending therethrough, said housing openings and said handle openings being laterally aligned with one another to properly position the handle relative to the housing when said attachment and removable housing portions are fastened to one another with said end portion of the handle clamped therebetween, said attachment and removable housing portions being generally hollow and each including internal reinforcing ribs protruding inwardly therefrom and extending laterally therewithin, said reinforcing ribs engaging exterior portions of said handle end portion at locations thereon that are separated from said handle openings when said attachment and removable housing portions are fastened to one another with said handle end portion clamped therebetween.

15. An electrically-powered appliance having a housing, an elongated hollow tubular handle, an elongated electrical cable extending longitudinally within the tubular handle, and attachment means for attaching the tubular handle to the housing, said attachment means including an attachment portion of the housing, a removable portion of the housing, and fastener means for fastening said attachment and removable housing portions to one another with an end portion of the tubular handle clamped therebetween, said end portion of the tubular handle having handle openings extending laterally therethrough on laterally-aligned opposite sides thereof, and each of said attachment and removable housing portions having at least one housing opening extending therethrough, said housing openings and said handle openings being laterally aligned with one another to properly position the handle relative to the housing when said attachment and removable housing portions are fastened to one another with said end portion of the handle clamped therebetween, said attachment and removable housing portions being generally hollow and each including internal reinforcing ribs protruding inwardly therefrom and extending laterally therewithin, said reinforcing ribs engaging said handle end portion when said attachment and removable housing portions are fastened to one another with said handle end portion clamped therebetween, and said attachment and removable housing portions each including an annular boss generally surrounding the respective housing opening therethrough, said handle openings receiving said annular bosses therein to ensure said proper positioning of the handle when said attachment and removable housing portions are fastened to one another with said end portion of the handle clamped therebetween.

16. An appliance according to claim 15, wherein said fastener means includes a threaded male fastener insertable into said handle and housing openings from a first side of the appliance to extend therethrough and a threaded female fastener engageable with said threaded male fastener on a second, opposite side of the appliance.

17. An appliance according to claim 16, wherein said male fastener has a head end portion at one end thereof and a threaded end portion at the opposite end thereof, said housing opening on one of said attachment and removable housing portions having a recess opening formed therearound for receiving said head end portion in a recessed relationship relative to the housing, said housing opening on the other of said attachment and removable housing portions also having a recess opening formed therearound for receiving, engaging and rotationally restraining said female fastener.

18. An appliance according to claim 17, wherein said appliance includes a number of said laterally-aligned handle and housing openings spaced longitudinally apart from one another, and a corresponding number of said fastener means.

19. An appliance according to claim 18, wherein each of said male fasteners has a non-threaded shank portion between said head end portion and said threaded end portion, said shank portion extending from one side to the other of said hollow tubular handle end portion.

20. An electrically-powered appliance having a housing with an internal side and an external side, an elongated hollow tubular handle, an elongated electrical cable extending longitudinally within the tubular handle, and attachment means for attaching the tubular handle to the housing, said attachment means including an attachment portion of the housing, a removable portion of the housing, and fastener means for fastening said attachment and removable housing portions to one another with an end portion of the tubular handle clamped therebetween, said end portion of the tubular handle having handle openings extending laterally therethrough on laterally-aligned opposite sides thereof, each of said attachment and removable housing portions having at least one housing opening extending therethrough and an internal annular boss generally surrounding said housing opening, said housing openings and said handle openings being laterally aligned with one another and said handle openings receiving said annular bosses therein to properly position the handle relative to the housing when said attachment and removable housing portions are fastened to one another with said end portion of the handle clamped therebetween, said fastener means including a threaded male fastener insertable into said handle and housing openings from a first side of the appliance to extend therethrough and a threaded female fastener engageable with said threaded male fastener on a second, opposite side of the appliance, said male fastener having a head end portion at one end thereof and a threaded end portion at the opposite end thereof, said housing opening on one of said attachment and removable housing portions having an external recess opening formed therearound for receiving said head end portion in a recessed relationship relative to the housing, said housing opening on the other of said attachment and removable housing portions also having an external recess opening formed therearound for receiving, engaging and rotationally restraining said female fastener, at least one of said annular bosses having a larger portion and a smaller portion stepped-down relative to said larger portion at an end thereof, said stepped-down smaller portion being received within one of said handle openings, and said larger portion abuttingly engaging an outer surface of said end portion of the handle.

21. An appliance according to claim 20, wherein said appliance includes a number of said laterally-aligned handle and housing openings spaced longitudinally apart from one another, and a corresponding number of said fastener means.

22. An appliance according to claim 21, wherein each of said male fasteners has a non-threaded shank portion between said head end portion and said threaded end portion, said shank portion extending from one side to the other of said hollow tubular handle end portion.

23. An appliance according to claim 20, wherein the appliance is a lawn edger.

24. An appliance according to claim 20, wherein said internal annular boss on one of said attachment and removable housing portions is laterally elongated and extends laterally completely through said end portion of the hollow tubular handle and through said handle openings on said laterally-aligned opposite sides thereof to engage the internal annular boss on the other of said attachment and removable housing portions.

25. An appliance according to claim 24, wherein said internal annular boss on the other of said attachment and removable housing portions includes an internal recess opening surrounding said housing opening therein, said internal recess opening receiving said laterally elongated internal annular boss therein.

26. An appliance according to claim 25, wherein the appliance is a lawn edger.

27. An electrically-powered appliance having a housing with an internal side and an external side, an elongated hollow tubular handle, an elongated electrical cable extending longitudinally within the tubular handle, and attachment means for attaching the tubular handle to the housing, said attachment means including an attachment portion of the housing, a removable portion of the housing, and fastener means for fastening said attachment and removable housing portions to one another with an end portion of the tubular handle clamped therebetween, said end portion of the tubular handle having handle openings extending laterally therethrough on laterally-aligned opposite sides thereof, each of said attachment and removable housing portions having at least one housing opening extending therethrough and an internal annular boss generally surrounding said housing opening, said housing openings and said handle openings being laterally aligned with one another and said handle openings receiving said annular bosses therein to properly position the handle relative to the housing when said attachment and removable housing portions are fastened to one another with said end portion of the handle clamped therebetween, said fastener means including a threaded male fastener insertable into said handle and housing openings from a first side of the appliance to extend therethrough and a threaded female fastener engageable with said threaded male fastener on a second, opposite side of the appliance, said male fastener having a head end portion at one end thereof and a threaded end portion at the opposite end thereof, said housing opening on one of said attachment and removable housing portions having an external recess opening formed therearound for receiving said head end portion in a recessed relationship relative to the housing, said housing opening on the other of said attachment and removable housing portions also having an external recess opening formed therearound for receiving, engaging and rotationally restraining said female fastener, said appliance including a number of said laterally-aligned handle and housing openings spaced longitudinally apart from one another, and a corresponding number of said fastener means, each of said male fasteners having a non-threaded shank portion between said head end portion and said threaded end portion, said shank portion extending from one side to the other of said hollow tubular handle end portion, and said attachment and removable housing portions being generally hollow and each including internal reinforcing ribs protruding inwardly therefrom and extending laterally therewithin, said reinforcing ribs engaging said handle end portion when said attachment and removable housing portions are fastened to one another with said handle end portion clamped therebetween.

* * * * *